United States Patent
De La Mora Ramirez et al.

(10) Patent No.: US 9,452,715 B2
(45) Date of Patent: Sep. 27, 2016

(54) VEHICLE COMPONENT COUPLING SYSTEMS AND METHODS

(71) Applicant: GM GLOBAL TECHNOLOGY OPERATIONS LLC, Detroit, MI (US)

(72) Inventors: Rodolfo De La Mora Ramirez, Toluca (MX); Alberto Soto Pineda, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 30 days.

(21) Appl. No.: 14/531,277

(22) Filed: Nov. 3, 2014

(65) Prior Publication Data

US 2016/0121802 A1    May 5, 2016

(51) Int. Cl.
*F16B 5/06* (2006.01)
*B60R 11/00* (2006.01)
*B60R 13/02* (2006.01)

(52) U.S. Cl.
CPC ............... *B60R 11/00* (2013.01); *B60R 13/02* (2013.01); *B60R 13/0206* (2013.01); *F16B 5/0664* (2013.01); *B60R 2011/0049* (2013.01); *B60R 2013/0293* (2013.01)

(58) Field of Classification Search
CPC ....... B60R 13/00; B60R 13/01; B60R 13/02; B60R 13/0206; B60R 13/0212; B60R 13/0225; B60R 13/0231; B60R 13/0237; B60R 13/0243; B60R 13/025; B60R 13/0256; B60R 13/0262; B60R 13/0268; B60R 13/0275; B60R 13/086; B60R 2013/018; B60R 2013/02931; B60R 11/00; B60R 2011/0049; F16B 5/0664
USPC .............. 296/193.03, 70, 146.1, 146.7, 1.06, 296/1.07, 1.08, 97.9, 39.1, 39.3, 214, 191
See application file for complete search history.

(56) References Cited

U.S. PATENT DOCUMENTS

| | | | | |
|---|---|---|---|---|
| 5,186,517 A * | 2/1993 | Gilmore | ................. | B60R 11/00 24/295 |
| 5,433,498 A * | 7/1995 | Ishiwata | ............. | B60R 13/0206 24/625 |
| 6,250,708 B1 * | 6/2001 | Kurachi | ................. | B60J 3/0221 296/97.9 |
| 6,511,029 B2 * | 1/2003 | Sawayanagi | ........... | B60J 3/0217 248/224.8 |
| 2002/0017800 A1 * | 2/2002 | Ichikawa | ................. | B60J 3/023 296/97.9 |
| 2008/0022602 A1 * | 1/2008 | Senoo | .................... | B60N 2/466 49/502 |
| 2010/0019534 A1 * | 1/2010 | Lipski | ................. | B60R 13/0243 296/146.7 |
| 2012/0119532 A1 * | 5/2012 | She | ....................... | B60R 13/025 296/1.08 |
| 2013/0285419 A1 * | 10/2013 | Lizak | .................. | B60R 13/0206 296/214 |
| 2014/0265456 A1 * | 9/2014 | Huelke | ............... | B60R 13/0231 296/214 |
| 2014/0284962 A1 * | 9/2014 | Mally | .................. | F16B 5/0657 296/146.7 |

* cited by examiner

*Primary Examiner* — Gregory Blankenship
(74) *Attorney, Agent, or Firm* — Cantor Colburn LLP

(57) ABSTRACT

In one aspect, a coupling system is provided. The coupling system includes a first component comprising a body, a second component comprising an inner wall defining at least one receiving aperture, wherein a notch is formed in the inner wall, and at least one tab extending outwardly from the body. The at least one tab is biased in a direction away from the body, and a retention feature is formed on the at least one tab and configured to interferingly engage the notch. When the at least one tab is inserted into a corresponding receiving aperture of the at least one receiving aperture, the at least one tab is biased against the inner wall and the retention feature interferingly engages the notch to facilitate coupling the first component to the second component in a desired orientation.

17 Claims, 3 Drawing Sheets

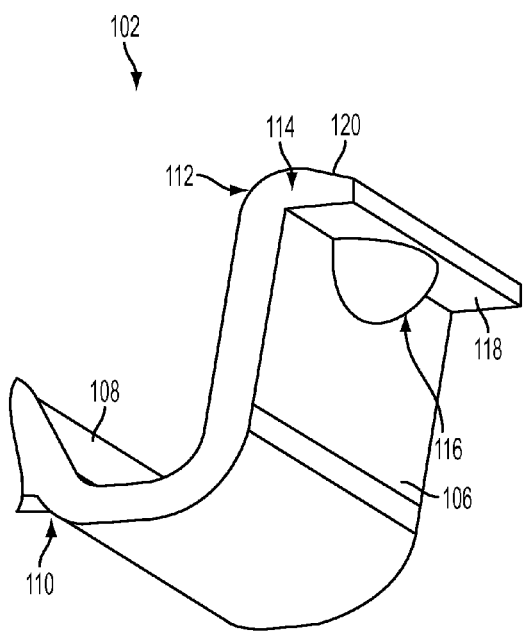
FIG. 2
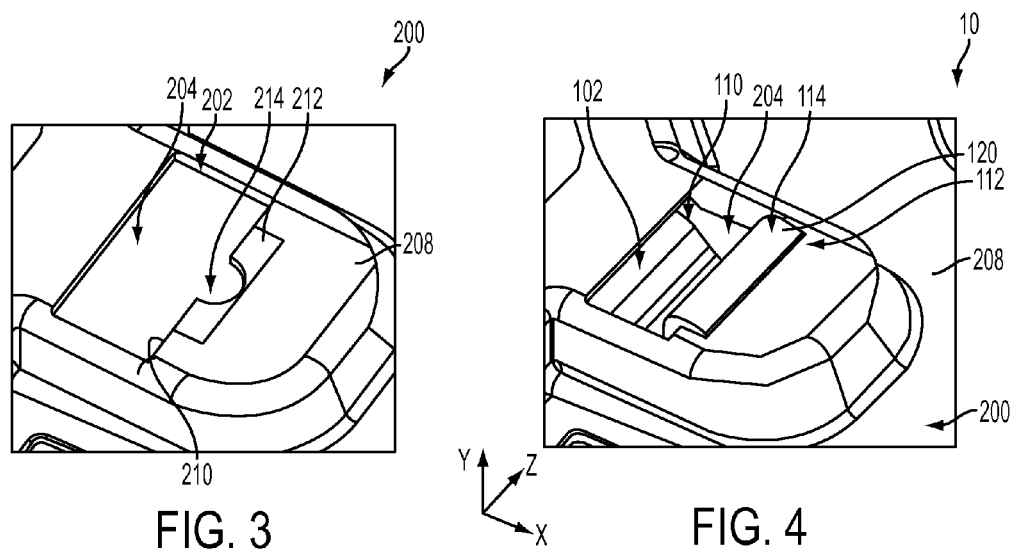
FIG. 3
FIG. 4

VEHICLE COMPONENT COUPLING SYSTEMS AND METHODS

FIELD OF THE INVENTION

The subject invention relates to matable components and, more specifically, to matable vehicle components.

BACKGROUND

Components, in particular vehicular components used in automotive vehicles, may be coupled to each other with one or more fasteners such as screws or bolts. However, the use of fastener systems results in increased parts, increased cost, increased assembly time, and may lead to relative motion between the components/fasteners, which may cause undesirable noise such as squeaking and rattling.

SUMMARY OF THE INVENTION

In one aspect, a coupling system is provided. The coupling system includes a first component comprising a body, a second component comprising an inner wall defining at least one receiving aperture, wherein a notch is formed in the inner wall, and at least one tab extending outwardly from the body. The at least one tab is biased in a direction away from the body, and a retention feature is formed on the at least one tab and configured to interferingly engage the notch. When the at least one tab is inserted into a corresponding receiving aperture of the at least one receiving aperture, the at least one tab is biased against the inner wall and the retention feature interferingly engages the notch to facilitate coupling the first component to the second component in a desired orientation.

In another aspect, a vehicle is provided. The vehicle includes a vehicle body and a coupling system arranged within the vehicle body. The coupling system includes a first component comprising a main body, a second component comprising an inner wall defining at least one receiving aperture, wherein a notch is formed in the inner wall, and at least one tab extending outwardly from the main body. The at least one tab is biased in a direction away from the main body, and a retention feature is formed on the at least one tab and configured to interferingly engage the notch. When the at least one tab is inserted into a corresponding receiving aperture of the at least one receiving aperture, the at least one tab is biased against the inner wall and the retention feature interferingly engages the notch to facilitate coupling the first component to the second component in a desired orientation.

In yet another aspect, a method of manufacturing a coupling system is provided. The method includes forming a first component having a body, forming a second component having an inner wall defining at least one receiving aperture, wherein a notch is formed in the inner wall, and forming at least one tab extending outwardly from the body. The at least one tab is biased in a direction away from the body, and a retention feature is formed on the at least one tab. The retention feature is configured to interferingly engage the notch. When the at least one tab is inserted into a corresponding receiving aperture of the at least one receiving aperture, the at least one tab is biased against the inner wall and the retention feature interferingly engages the notch to facilitate coupling the first component to the second component in a desired orientation.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 2 is a perspective view of an exemplary tab of the system shown in FIG. 1;

FIG. 3 is a perspective view of an exemplary receiving aperture of the system shown in FIG. 1;

FIG. 4 is a perspective view of a portion of the system shown in FIG. 1 after assembly.

DETAILED DESCRIPTION

Figure 1:
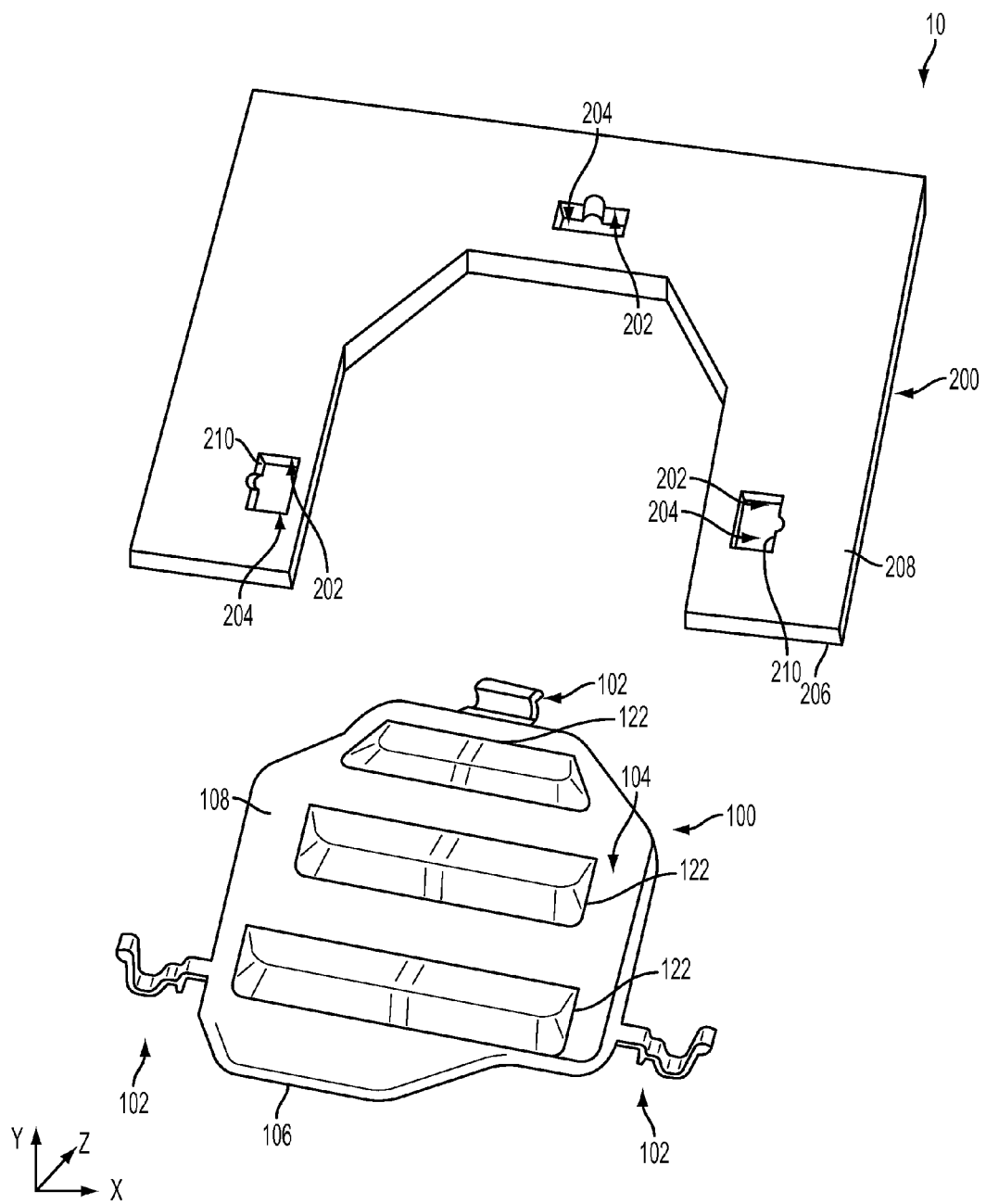
FIG. 1 is a perspective view of an exemplary coupling system before assembly.

The following description is merely exemplary in nature and is not intended to limit the present disclosure, its application or uses. For example, the embodiments shown are applicable to vehicle components, but the system disclosed herein may be used with any suitable components to provide securement and retention of mating components and component applications, including many industrial, consumer product (e.g., consumer electronics, various appliances and the like), transportation, energy and aerospace applications, and particularly including many other types of vehicular components and applications, such as various interior, exterior, electrical and under hood vehicular components and applications. It should be understood that throughout the drawings, corresponding reference numerals indicate like or corresponding parts and features.

Any suitable material may be used for the mating components and their features disclosed herein and discussed further below. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends.

As used herein, the term vehicle is not limited to just an automobile, truck, van or sport utility vehicle, but includes any self-propelled or towed conveyance suitable for transporting a burden.

FIG. 1 illustrates an exemplary coupling system 10 that generally includes a first component 100 to be mated to a second component 200.

In the exemplary embodiment, first component 100 includes a plurality of biasing tabs or members 102, and second component 200 includes a plurality of inner walls 202 each defining a receiving aperture 204. Biasing tabs 102 and receiving apertures 204 are fixedly disposed on or formed integrally with respective component 100, 200 for proper alignment and orientation when components 100 and 200 are mated. In the exemplary embodiment, first component 100 includes three biasing tabs 102 and three corresponding receiving apertures 204. However, components 100, 200 may have any number and combination of respective tabs 102 and apertures 204.

Biasing tabs 102 are configured and disposed to matingly engage alignment apertures 204, as discussed herein in more detail, to couple first component 100 to second component 200. Further, biasing tabs 102 and alignment apertures 204 facilitate a secure coupling between first and second components 100, 200, thereby reducing or preventing relative movement therebetween.

With additional reference to FIG. 2, in the exemplary embodiment, first component 100 generally includes a body 104 having an outer surface 106 and an inner surface 108. Biasing tabs 102 each include a proximal end 110 coupled to body 104, and a distal end 112, which includes a flange 114 and a spherical retention feature 116. Flange 114 extends outwardly from outer surface 106 of tab distal end 112 and defines a planar retention surface 118 and an insertion surface 120. Spherical retention feature 116 is disposed between and extends from the intersection between outer surface 106 of tabs distal end 112 and planar retention surface 118. In one embodiment, the spherical shape of retention feature 116 is critical to movement restriction in the x, y, and z directions. In other embodiments, retention feature 116 may have other suitable shapes (e.g., cylindrical). Moreover, although three biasing tabs 102 are illustrated, first component 100 may have any number of biasing tabs that enables system 10 to function as described herein. Further, body 104 may additionally include one or more features such as, for example, air vents 122.

With additional reference to FIG. 3, second component 200 generally includes an outer surface 206 and an inner surface 208. Inner wall 202 defines an engagement wall 210, and inner surface 208 includes a planar retention surface 212 defining a semi-circular notch 214 configured to receive spherical retention feature 116. In one embodiment, semi-circular notch 214 is sized slightly smaller (e.g., 1 mm) than retention feature 116 such that retention feature 116 may interference-fit or snap-fit into notch 214. This enables thermal expansion and contraction of first component 100 and/or second component 200 without biasing tab 102 disengaging from inner wall 202. Moreover, notch 214 may have any suitable shape to receive and engage a specific shape of retention feature 116. In the exemplary embodiment, alignment apertures 204 are generally rectangular. However, alignment apertures 204 may have any shape that enables system 10 to function as described herein.

While not being limited to any particular structure, first component 100 may be a service access door, and second component 200 may be a front panel in the bottom of a vehicle that is part of, or is attached to, the vehicle and on which first component 100 is coupled. When service access door 100 is uncoupled from front panel 200, access is provided to, for example, front fog lamps. Once access is no longer needed, service access door 100 may be subsequently coupled to front panel 200, as is describe herein in more detail.

In the exemplary embodiment, biasing tabs 102 are biased away from first component body 104, but may flex inward toward body 104. As such, when each biasing tab 102 is inserted into a corresponding receiving aperture 204 during assembly, angled insertion surface 120 contacts inner surface 208 and/or engagement wall 210, which forces biasing tab distal end 112 toward first component body 104 and provides clearance for insertion of tab distal end 112 into receiving aperture 204.

Once flange 114 extends beyond engagement wall 210, and due to tab 102 being biased away from component body 104, biasing tab 102 flexes outward and away from first component body 104 until distal end outer surface 106 contacts engagement wall 210. As such, spherical retention feature 116 is located within semi-circular notch 214, and planar retention surface 118 is disposed against or in proximity to planar retention surface 212.

Figure 5:
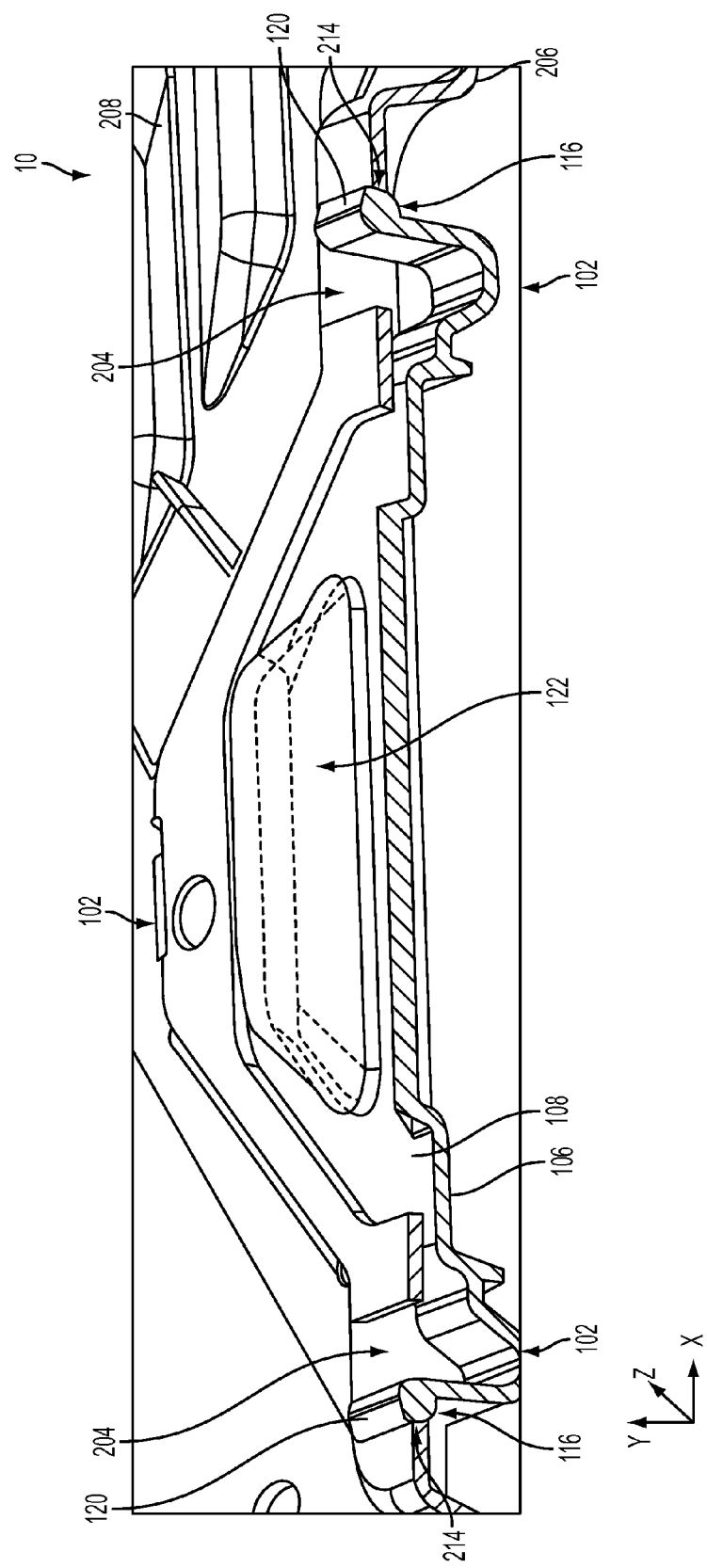
FIG. 5 is sectional view of the system shown in FIG. 1 after assembly.

Accordingly, when components 100, 200 are assembled as shown in FIGS. 4 and 5, tab outer surface 106 and engagement wall 210 reduce or prevent relative movement of components 100, 200 in the x-direction, retention surface 118 and retention surface 212 reduce or prevent relative movement of components 100, 200 in the y-direction, and spherical retention feature 116 and semi-circular notch 214 reduce or prevent relative movement of components 100, 200 in the z-direction and the x-direction.

As illustrated in FIG. 5, with biasing tabs 102 arranged on first component 100 at three or more points (e.g., positioned 90° apart), tab outer surfaces 106 and engagement walls 210 reduce or prevent relative movement in the +/−x-direction and the +z-direction, retention surfaces 118 and retention surfaces 212 reduce or prevent relative movement in the +/−y-direction, and spherical retention features 116 and semi-circular notches 214 reduce or prevent relative movement of components 100, 200 in the +/−z-direction and the +/−x-direction.

Described herein are systems and methods for a coupling arrangement for proper coupling and retention between two components to eliminate tolerance variation between components, unwanted noise, fastener usage, and misalignment between the components. Biased tabs of one component include spherical features that interact with semi-circular notches formed in the other component to facilitate the desired coupling. As such, the coupling arrangement maintains component position, assures a proper interface therebetween, prevents or restricts movement in x, y, and/or z-directions, and absorbs thermal variation of the two components. Additionally, coupling system assures recyclability, reliability, and durability over many usage cycles, and can be repeatedly installed and detached in a short amount of time.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A coupling system comprising:
a first component comprising a body;
a second component comprising an inner wall defining at least one receiving aperture, wherein a notch is formed in the inner wall;
at least one tab extending outwardly from the body, the at least one tab biased in a direction away from the body; and a retention feature projecting proudly of the at least one tab and configured to interferingly engage the notch, wherein when the at least one tab is inserted into a corresponding receiving aperture of the at least one receiving aperture, the at least one tab is biased against the inner wall and the retention feature interferingly engages the notch to facilitate coupling the first component to the second component in a desired orientation.

2. The coupling system of claim 1, wherein the retention feature is spherical.

3. The coupling system of claim 1, wherein the notch is semi-circular.

4. The coupling system of claim 1, wherein the at least one tab comprises a distal end having a flange extending therefrom.

5. The coupling system of claim 4, wherein the flange comprises an angled insertion surface and a retention surface, the angled insertion surface configured to engage the second component to facilitate insertion of the at least one tab into the receiving aperture, and the retention surface configured to engage the second component when the at least one tab is inserted into the receiving aperture.

6. A vehicle comprising:
a vehicle body; and
a coupling system arranged within the vehicle body, the coupling system comprising:
a first component comprising a main body;
a second component comprising an inner wall defining at least one receiving aperture, wherein a notch is formed in the inner wall;
at least one tab extending outwardly from the main body, the at least one tab biased in a direction away from the main body; and
a retention feature projecting proudly of the at least one tab and configured to interferingly engage the notch, wherein when the at least one tab is inserted into a corresponding receiving aperture of the at least one receiving aperture, the at least one tab is biased against the inner wall and the retention feature interferingly engages the notch to facilitate coupling the first component to the second component in a desired orientation.

7. The vehicle of claim 6, wherein the retention feature is spherical.

8. The vehicle of claim 6, wherein the notch is semi-circular.

9. The vehicle of claim 6, wherein the at least one tab comprises a distal end having a flange extending therefrom.

10. The vehicle of claim 9, wherein the flange comprises an angled insertion surface and a retention surface, the angled insertion surface configured to engage the second component to facilitate insertion of the at least one tab into the receiving aperture, and the retention surface configured to engage the second component when the at least one tab is inserted into the receiving aperture.

11. The vehicle of claim 6, wherein the first component is a service access door.

12. The vehicle of claim 11, wherein the second component is a front panel in the bottom of the vehicle.

13. A method of manufacturing a coupling system, the method comprising:
forming a first component having a body;
forming a second component having an inner wall defining at least one receiving aperture, wherein a notch is formed in the inner wall;
forming at least one tab extending outwardly from the body, the at least one tab biased in a direction away from the body; and
forming a retention feature projecting proudly of the at least one tab, the retention feature configured to interferingly engage the notch, wherein when the at least one tab is inserted into a corresponding receiving aperture of the at least one receiving aperture, the at least one tab is biased against the inner wall and the retention feature interferingly engages the notch to facilitate coupling the first component to the second component in a desired orientation.

14. The method of claim 13, further comprising forming the first component as a service access door for a vehicle.

15. The method of claim 14, further comprising forming the second component as a front panel in the bottom of the vehicle.

16. The method of claim 13, further comprising forming the retention feature as spherical.

17. The method of claim 16, further comprising forming the notch as semi-circular.

* * * * *